United States Patent [19]

Sasaki et al.

[11] 4,142,780
[45] Mar. 6, 1979

[54] EXCHANGEABLE LIQUID CRYSTAL PANEL

[75] Inventors: Takehiko Sasaki, Yomatokoriyama; Tamotsu Koyama, Kashihara, both of Japan

[73] Assignee: Sharp Kabushiki Kaisha, Osaka, Japan

[21] Appl. No.: 562,982

[22] Filed: Mar. 28, 1975

[30] Foreign Application Priority Data

Mar. 29, 1974 [JP] Japan .................................. 49-35853
Apr. 2, 1974 [JP] Japan .................................. 49-37591

[51] Int. Cl.$^2$ ........................ G02F 1/13; H01R 11/02
[52] U.S. Cl. ............................... 350/334; 339/61 M; 339/DIG. 3
[58] Field of Search .............. 350/160 LC; 339/59 M, 339/61 M, DIG. 3; 174/52 PE; 58/50 R

[56] References Cited

U.S. PATENT DOCUMENTS

| | | | |
|---|---|---|---|
| 3,638,163 | 1/1972 | Loosme | 339/59 M X |
| 3,795,037 | 3/1974 | Luttmer | 339/59 M X |
| 3,795,884 | 3/1974 | Kotaka | 339/59 M X |
| 3,818,414 | 6/1974 | Davies et al. | 339/59 M X |
| 3,861,135 | 1/1975 | Seeger, Jr. et al. | 58/50 R |
| 3,863,436 | 2/1975 | Schwarzschild et al. | 58/50 R |

Primary Examiner—John K. Corbin
Assistant Examiner—Rolf Hille
Attorney, Agent, or Firm—Birch, Stewart, Kolasch and Birch

[57] ABSTRACT

Interconnection is removably provided between a liquid crystal panel and a circuit board or semiconductor chip which provides exchangeability for the liquid crystal panel which is advantageous because of the limited operating life inherent in liquid crystal composites. Contact areas of the circuit chip confront contact areas (or electrode areas) of the liquid crystal panel with interposition of compressible and resilient connector means which complete the circuit therebetween. In one of the preferred embodiments of the present invention, the compressible connector means comprises a rod-like dielectric compressible resilient material such as, for example, rubber and a predetermined number of ring-shaped compressible, resilient electroconductive members such as, for example, conductive rubber. In another preferred form, the electroconductive members comprise discrete stratified conductive members embedded in the rod-like dielectric material in desired alignment with the opposed contact areas.

9 Claims, 12 Drawing Figures

EXCHANGEABLE LIQUID CRYSTAL PANEL

BACKGROUND OF THE INVENTION

1. Field of the Invention

The present invention relates to a liquid crystal panel and, more particularly, to an exchangeable compact liquid crystal panel which is used in electronic wristwatches, etc.

2. Brief Description of the Prior Art

It is well known in the art that liquid crystal cells or composites possess only a limited operating life. It is therefore desirable for the liquid crystal cells to be detachably or removably mounted for maintenance or repair when they are incorporated into a display panel for use in electronic wristwatches or electronic calculators.

However, the liquid crystal panel has a multiplicity of contact or electrode areas, and thus requires much difficulty is experienced in ensuring that their electrode areas are held in electrical conducting relationship with a circuit board such as a printed circuit board and a ceramic substrate carrying a driving circuit thereon for the liquid crystal panel.

Although several techniques are available in the prior art for completing a circuit between opposed contact areas of the liquid crystal panel and the circuit board, it is conventional that the electode areas are individually connected directly to respective strip line connecters printed on the board through the use of electroconductive adhesive. No exchangeability is provided in this instance, particularly in the case of a small size liquid crystal panel used in electronic wristwatches and calculators as set forth above.

SUMMARY OF THE INVENTION

The present invention comprises compressible, resilient connector means including a rod-like retainer of compressible, resilient dielectric material and a multiplicity of discrete connector regions of compressible, resilient electroconductive material. A multiplicity of electrode or contact areas of a liquid crystal panel are positioned external to the housing thereof. The resilient connector means are interposed between the electrode areas of the liquid crystal panel and the corresponding contact areas of a circuit board or substrate on which a driver circuit for the liquid crystal panel is mounted, in a manner to hold the discrete connector regions in desired alignment with the electrode areas of the liquid crystal panel. The application of a small amount of pressure to the resilient connector means insures that the electrode areas of the liquid crystal panel are held in electrical contact with the respective contact areas of the circuit board.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIGS. 1a and b is a perspective view of a liquid crystal display panel used in the present invention.

DETAILED DESCRIPTION

Figures 1A, 1B:
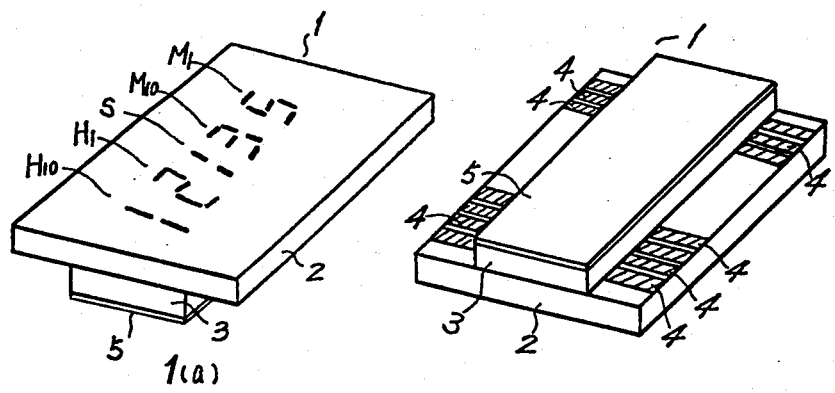

Referring now to FIG. 1, there is shown a perspective representation of a liquid crystal panel comprising a multiplicity of liquid crystal cells, designated generally by the reference number 1. This liquid crystal panel 1 comprises a given liquid crystal composite (not shown in the drawings) enclosed by a pair of transparent glass plates 2 and 3, one carrying multiple contact or electrode areas 4 equally spaced long both sides thereof as shown in FIG. 1 (b) and the other carrying a reflector panel 5, if the liquid crystal cell is the reflection type.

In employing the liquid crystal panel 1 as a display for electronic wristwatches, as viewed from FIG. 1 (a), the liquid crystal panel 1 consists of four numeral displays $M_1$, $M_{10}$, $H_1$ and $H_{10}$ for minutes, tens of minutes, hours and tens of hours, respectively. Also included is an additional display S for seconds, which can display seconds, for example, through its two blinking dots. For the typical font, the displays $M_1$, $M_{10}$ and $H_1$ include seven segments and the displays $H_{10}$ and S include a single segment. Therefore, the liquid crystal display panel 1 has a total of 24 segments (and thus 24 contact or electrode areas) inclusive the common electrode, in the illustrated embodiment.

Figures 2A, 2B:
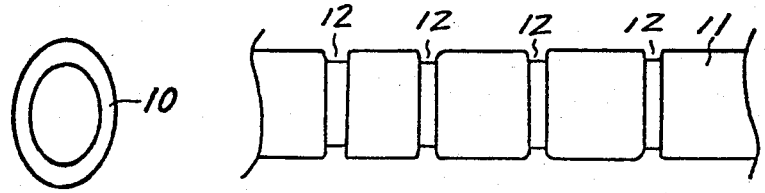
FIGS. 2a and b is a schematic illustration of a compressible, resilient connector means constructed in accordance with the principles of the present invention.

FIG. 2 depicts an example of the resilient connector means constructed in accordance with the principle of the present invention. FIG. 2A illustrates a ring-shaped connector 10 made of a compressible, resilient, electroconductive material such as, for example, conductive rubber, while FIG. 1B illustrates a rod-like retainer 11 made of a compressible, resilient, dielectric material such as conventional rubber.

In practical use the connector 10 has a internal diameter of 1.0mm and an external diameter of 2.0mm. Fortunately, it has been found that a high quality water-proof ring for a push switch suitable for mass production in the art of wristwatch serves fully as such a ring-shaped connector for use in the present invention.

Figure 3:
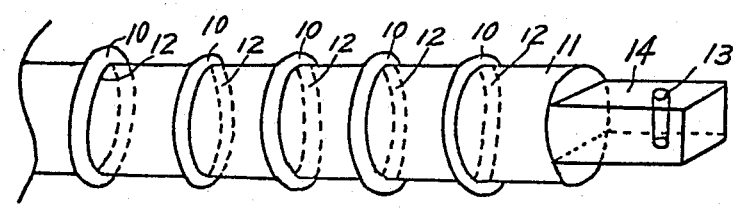
FIG. 3 is a perspective view of the connector means of FIG. 2 wherein ring-shaped electroconductive connectors are secured on a rod-like retainer.

The dielectric retainer 11 has a substantially circular cross-section and a plurality of recesses 12 circumferentially formed thereon for receiving the ring-shaped connectors 10 in equally spaced relationship. A multiplicity of the ring-shaped connectors 10 fitted into the recesses 12 are illustrated in FIG. 3, which further shows an installation portion 14 at its terminating ends having an opening 13.

Figure 4:
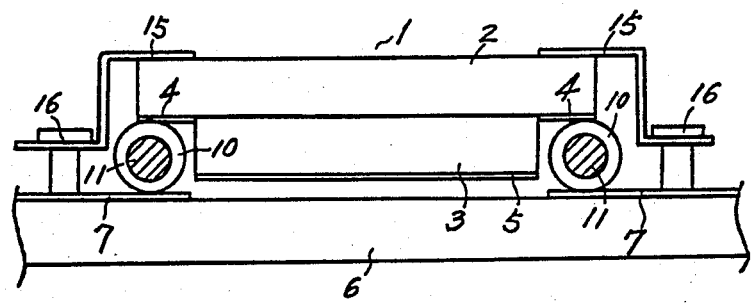
FIG. 4 is a cross-sectional view showing the relation between the liquid crystal panel and a circuit board when they are held in electrical conducting relationship through the use of the compressible, resilient connector means.

In FIG. 4 the liquid crystal display panel 1 is held in electrical connecting relationship with contact areas 7, of the printed circuit board 6 through the use of the abovementioned compressible, resilient connector means. The respective ring-shaped connectors 10 are thus positioned and held in electrical conducting relationship between the associated contact areas of the liquid crystal display panel 1 and the printed circuit board 6. Pressure angles 15 support or embrace at their one end thereof the first glass plate 2 carrying the multiplicity of electrode areas of the liquid crystal panel, with the other end thereof being fixedly secured to the circuit board 6 through screws 16, thereby depressing the liquid crystal panel 1 in the downward direction. Although not shown in FIG. 4, respective poles extending upward from the circuit board 6 fit into the openings 13 shown in FIG. 2, thereby permitting no movement of the liquid crystal panel.

Figure 5:
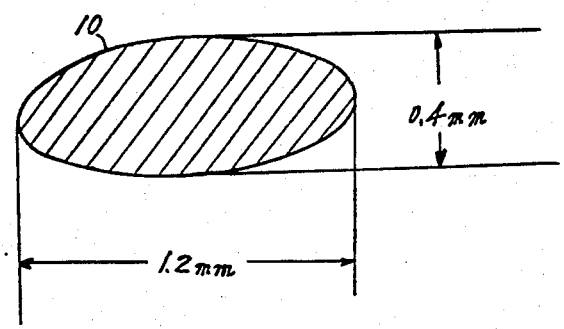
FIG. 5 is an enlarged cross-sectional view of a portion of the ring-shaped electroconductive conductor which is in physical contact with the liquid crystal electrode area.

It has been determined that the compressible factor of the ring-shaped connector 10, preferably of 20%–30%, makes it possible to tolerate long time usage. Analysis of the contact region of the compressed connector which actually contacts the electrode area 4 or the strip line connector 7 shows that it takes on a substantially elliptical shape with a height of 0.4mm and a width of 1.2mm as viewed from FIG. 5. Since the contact resistance is essentially dependent upon the contacting area, the respective contact resistances in the given example are placed well within the scope of 3 KΩ ± 50%. The contact resistance required by the liquid crystal panel 1 should be at or below the order of 10 KΩ and, therefore, this requirement can be fully satisfied by the arrangement of the illustrated example. Differences in contact resistance between the respective contact areas may be reduced to ±50%. This is due to the reason that a much higher degree of accuracy is obtainable for the connector 10 and the retainer 11 because they both have a very simple shape and section. Further, pressure will be dispersed in the circumferential direction of the ring-like connector 10 thereby providing uniformity of pressure to the connector 10 and hence to the contact area of the contact regions.

Nevertheless, there is the great possibility as seen from FIG. 4 that in the case where the ring-shaped connectors 10 extend from the periphery of the dielectric retainer 11, they will cause shorting by contacting the reflector plate 5 of the liquid crystal panel 1 or the pressure angles 15.

Figure 6:
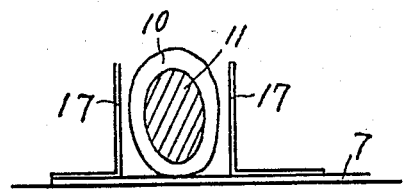
FIG. 6 is a partial cross-sectional view of the modification of the mechanism illustrated in FIG. 4.

To preclude any possible shorting, as shown in FIG. 6, a pair of dielectric films 17 such as polyethyleneterephthalate are employed to shield or surround the ring-like connectors 10. Also, the dielectric retainer 11 is provided with an elliptical shape with respect to the vertical direction.

Figure 7B:
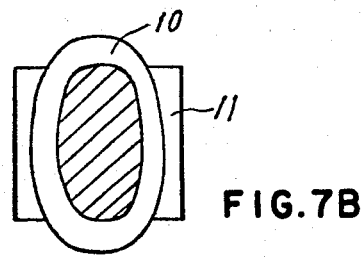
FIGS. 7a and b is a schematic illustration of the modification of the ring-shaped conductor.
Figure 7A:
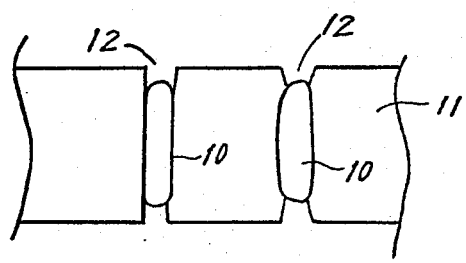

As an alternate, FIG. 7 shows another approach for overcoming the possible shorting problem wherein the compressible, resilient retainer 11 has a rectangular cross-section instead of a circular cross-section while the compressible, resilient connectors 10 have an elliptical cross-section so that the connectors 10 when fit into the recesses 12 extend from the pheripery of the retainer 11 only in the longitudinal direction. This prevents the connectors 10 from coming into contact with the pressure angle 15 or the reflector 10.

If exchange of the liquid crystal display panel 1 is requested, the screws 16 are unfastened and then removed from the pressure angles 15 to permit the liquid crystal panel 1 to be free from the apparatus.

Figure 8:
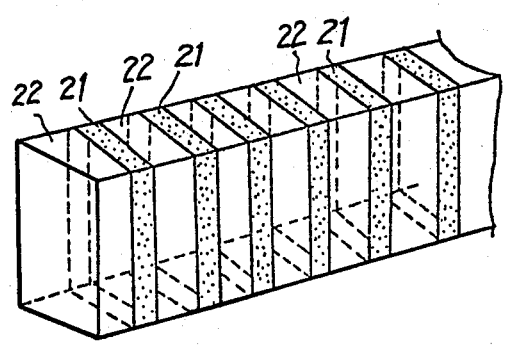
FIG. 8 is a perspective view of another example of a compressible, resilient connector means embodying the present invention.
Figure 9:
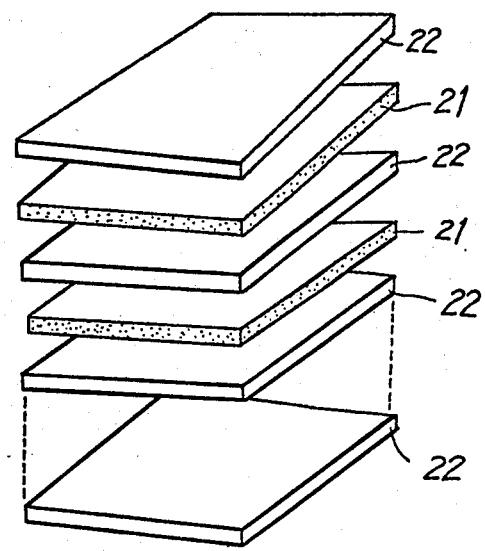
FIG. 9 is a disassembled illustration of he compressible, resilient connector means illustrated in FIG. 8.

FIGS. 8 and 9 suggest still another example of the connector means embodying the principle of the present invention, which includes a multiplicity of compressible, resilient, conductive regions 21 and a multiplicity of compressible, resilient dielectric regions 22, both combined in alternate fashion to form a single stack. While only certain embodiments of the present invention have been illustrated and described, it will be apparent to those skilled in the art that various changes and modifications may be made therein without departing from the spirit and scope of the invention as claimed.

What is claimed is:

1. In a combination comprising a liquid crystal cell having a multiplicity of contact areas and a circuit board having a multiplicity of contact areas, the improvement which comprises a compressible, resilient, connector means for connecting the contact areas of the liquid crystal cell with the contact areas of the circuit board, said connector means comprising a plurality of individual connectors made of a compressible, resilient, electroconductive material mounted on a retainer made of a compressible, resilient, electrically nonconductive material, the connectors being positioned in removable and electrical connecting relationship between opposed contact areas of the liquid crystal cell and the circuit board, the compressible and the resilient nature of the connectors and retainer functioning to distribute stress produced in the combination over both the connectors and the retainer, thereby substantially eliminating fatigue.

2. The combination as set forth in claim 1 wherein the respective connectors are ring-shaped and the retainer has a rod-like shape.

3. The combination of claim 2 wherein the rod-like retainer contains a plurality of substantially equally spaced, circumferentially formed recesses disposed along its length, each of said recesses containing a ring-shaped connector, the circumferential outer surface of said connectors extending beyond the circumferential outer surface of said retainer.

4. The combination of claim 2 wherein the ring-shaped connectors have a compressibility factor of about 20 to 30%.

5. The combination of claim 2 wherein the retainer has a rectangular cross-section and contains a plurality of substantially equally spaced, circumferentially formed recesses disposed along its length, each of said recesses containing a connector having a elliptical cross section so that the connectors extend from the periphery of the retainer only in their contacting direction.

6. The combination as set forth in claim 2 wherein the respective connectors have an elliptical shape.

7. The combination as set forth in claim 1 further comprising means for surrounding and shielding the noncontacting areas of the compressible, resilient, connector means.

8. The combination as set forth in claim 7 wherein said surrounding and shielding means comprises a dielectric film.

9. The combination as set forth in claim 1, wherein said compressible, resilient, connector means comprises a stack including a multiplicity of conductive regions made of a compressible, resilient, electroconductive material, and a multiplicity of non-conductive regions made of a compressible, resilient, electrically non-conductive material, said conductive regions and nonconductive regions being disposed alternatively with respect to each other.

* * * * *